United States Patent [19]

Onnen

[11] 3,907,527
[45] Sept. 23, 1975

[54] WET SCRUBBER APPARATUS
[75] Inventor: James H. Onnen, Louisville, Ky.
[73] Assignee: American Air Filter Company, Inc., Louisville, Ky.
[22] Filed: May 9, 1974
[21] Appl. No.: 468,555

[52] U.S. Cl. .................. 55/233; 55/91; 55/351; 55/474; 55/518; 261/98; 209/393; 209/489
[51] Int. Cl. ............................................ B01d 47/00
[58] Field of Search ....... 55/91, 233, 351, 474, 479, 55/518; 261/94, 98; 209/393, 488, 489; 23/288 S

[56] References Cited
UNITED STATES PATENTS

| 38,569 | 5/1863 | Douty .............................. 209/393 |
| 1,413,935 | 4/1922 | Ramsey et al. ..................... 209/1 |
| 2,251,678 | 8/1941 | Holt ............................. 209/393 X |
| 2,600,508 | 6/1952 | Lehman ......................... 209/393 X |
| 2,631,968 | 3/1953 | Peery ............................ 209/172 X |
| 3,199,923 | 8/1965 | Brooks ............................. 302/29 |
| 3,424,674 | 1/1969 | Webber ............................ 210/20 |
| 3,810,348 | 5/1974 | Byers et al. ..................... 261/98 X |

OTHER PUBLICATIONS
Zenz, F. A., and D. F. Othmer, Fluidization and Fluid-Particle Systems, pp. 258, 259, Reinhold Publishing Corp., New York, 1960.

Primary Examiner—Frank W. Lutter
Assistant Examiner—Kathleen J. Prunner

[57] ABSTRACT

In an improved wet scrubbing apparatus for mutual contact of fluids wherein the fluids pass through a contact zone, and fluid contact elements are continuously cycled between the contact zone and an element treating zone where they are treated with a treating fluid and forced from the element treating zone back into the contact zone, the improvement being a contact element removal section disposed within the cycling area of the contact elements whereby undersized elements are removed during operation of the apparatus.

5 Claims, 2 Drawing Figures

WET SCRUBBER APPARATUS

BACKGROUND OF THE INVENTION

Many apparatuses have been proposed to meet the various requirements of contacting different fluids, especially contacting gases and liquids traveling countercurrently through a contact zone. Such apparatuses include, for example, spray towers wherein the gas is allowed to rise in an unobstructed space within the tower while the liquid is introduced in the form of droplets, by means of a spray nozzle or other atomizing device. These droplets are allowed to fall through the upward-flowing gas. A low pressure drop and simple construction are the advantages of this type of apparatus. However, a disadvantage of spray towers of this type is the relatively high energy requirement to form the droplets, which together with the relatively small contact surface area thus produced and the low degree of turbulence within the droplets, result is a low absorption efficiency. Thus, a packed tower is normally used, except in cases where plugging is possible due to the existence or formation of a solid phase.

In packed towers the liquid stream is made to flow by gravity over the surface of a packing material while the gases are made to pass in, for example, countercurrent flow to the liquid through the free spaces in the packing. In this way a large surface of contact is established between the liquid and gas. The packed tower, while suitable for many applications where gas absorption is described, presents a number of disadvantages which are difficult to overcome. For example, since the usual type of packing may include crushed rock, coke, or specially shaped ceramic units such as raschig rings, the tower is usually bulky. Its throughput is limited, as free passage of fluids is provided only through the interstices and voids in the packing. When the free cross-sectional area between these interstices and voids is small, the frictional pressure drop across the packing will be high and more energy will be needed to circulate the gas. Moreover, high velocities will be required for a given or described throughput of gas. A second disadvantage of packed towers is that the velocity of gas in such towers must be kept generally below a certain limit which of course, puts a limit on the throughput. The velocity limitation is necessary because if the gas velocity exceeds a certain upper limit the gas tends to prevent the liquid from flowing downwardly and may even force it, in reverse flow, out of the tower altogether. The upper limit of the gas velocity is known as the flooding point. Still another disadvantage of packed towers is that the packing in the tower tends to settle with time thus further reducing from passage of the fluids and accentuating the problem referred to above.

A type of packed tower has been proposed wherein the packing is composed of light weight spheres adapted to form a unitary floating bed in which the spheres are in contact with one another yet maintain a limited freedom of movement relative to one another. The bed as a total unit then is designed to float in the upper region of the tower where it is retained from above by a retaining grid or plate. While the action of the floating bed is substantially of the same nature as that of conventional packing, notable in that it provides a large interfacial area of contact between the liquid descending through the interstices between the spheres and the gases ascending in countercurrent flow to the liquid, it has advantages over other more conventional systems. One such advantage is that due to the rotational and slight linear movement of the balls in the bed no channeling occurs. Solid particles carried by the liquid or gas do not settle permanently on the packing, but on the contrary may be continuously washed off. Plugging is thereby reduced and there is no need for periodic shut down to clean or replace the packing.

In this type of scrubber maintenance of the desired type of motion of the gas contact elements depends very closely upon the fluid velocities, and particularly on the velocity of the incoming dirty gas. With very low gas velocities there is not sufficient lift for the gas contact elements to be buoyed off a bottom restraining grid. This is particularly true where the densities of the elements are high and where the rate of liquid flow in the opposite direction to that of the gas flow is relatively high. On the other hand when the gas velocities are high there is a problem of lodging some or all of the gas contact elements against restraining grids even where their quantity is well within the limits described above. Specifically, the gas velocities used in this type of scrubber are generally in the range of about 500 to 1700 feet per minute while the fluid flow rate in the opposite direction is from about 10 to 75 U.S. gallons per minute per square foot. Correspondingly the flow rate of scrubbing liquid from treating fluid nozzles are usually in the range of about 1.0 and 25 gallons per minute. As a result of such higher velocity not only is throughput or capacity of the apparatus considerably increased but also absorption efficiency is markedly improved. Also recovery of the gas constituents is improved, which may be the purpose of the operation.

Further, consistent with the advantage of this type of scrubber, it should be noted that the packing or gas contact elements are generally made of various materials and are preferably hollow, thin walled balls of plastic or other synthetic resin or the like. Alternatively, other low density construction has been employed, such as various foamed plastics or other foamed materials having an impervious external surface. In some cases hollow or low density spheres of metal have been used or inflated plastic balls with a very thin wall containing gas under pressure have been used to provide elements of extremely low density. Generally, the gas contact elements are of a size up to about 4 inches in diameter or more, but are generally smaller. These gas contact elements are also generally of low density so that they are buoyed upwardly by the flow of dirty gas through the contact zone. However, these type of elements presents other problems, one being that due to the continuous contact between the light weight elements, the elements are subjected to wear and depending upon the nature of their material composition eventually become too small to be effective as contact elements.

The present invention solves the above problems and overcomes the above difficulties by providing a scrubbing apparatus having elements therein which circulate through a contact zone and then through an element treating zone and are removed from the apparatus when they wear to a preselected diameter. Thus, positive scrubbing in an economical, straight-forward manner is accomplished as well as elimination of circulating contact elements which are too small to be effective. Furthermore, the present invention provides a means for adding and removing contact elements to and from a scrubbing apparatus without disturbing the scrubbing operation.

SUMMARY OF THE INVENTION

To overcome the above problem of circulating undersized contact elements in prior scrubbers there has been developed an improved wet scrubbing apparatus for use in cleaning a gaseous fluid stream which comprises: a flow through housing having a dirty gas inlet at one end and a clean gas outlet at the opposite end defining a gas passageway therebetween, a first element restraining grid disposed across one extremity of the passageway; a second element restraining grid disposed across the other extremity of the passageway, the restraining grids allowing gas to pass therethrough; baffle means disposed within the passageway extending from a point adjacent to and spaced from the restraining grid at one extremity of the passageway to a point adjacent to and spaced from the restraining grid at the other extremity of the passageway dividing the passageway between the restraining grids into a contact zone and an element treating zone the baffle means defining an element entrance and element exit for the treating zone between the restraining grids; and, a plurality of gas contact elements loosely disposed between the restraining grids, the elements being of a density which allows them to be maintained in a buoyant state in the contact zone and directed into the treating zone as a consequence of the gas stream entering the dirty gas inlet and passing through the restraining grids; the improvement comprising an element removal means including a sloping surface disposed within the treating zone, the sloping surface having a diverging downwardly extending slot therein of preselected dimension to allow through passage of a preselected size of contact elements.

DESCRIPTION OF THE PREFERRED EMBODIMENT

Figure 1:
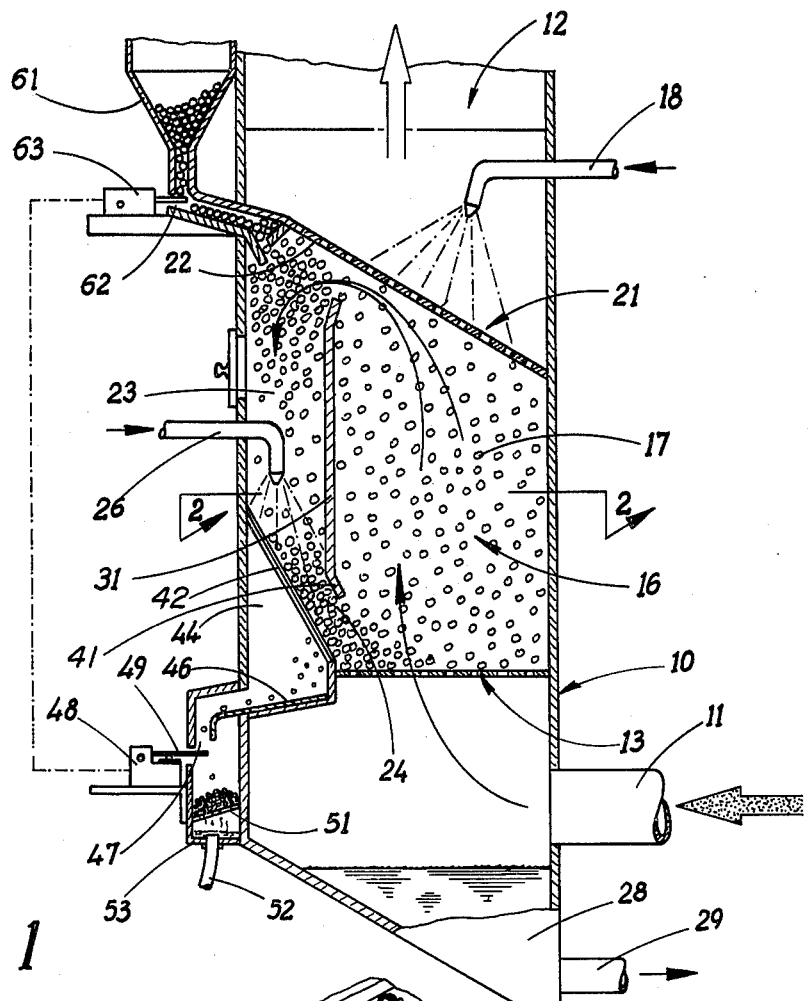
FIG. 1 is a cross-sectional elevational view of one embodiment of the present invention; and, FIG. 2 is an enlarged perspective view taken in a plane passing through line 2—2 of FIG. 1.
Figure 2:
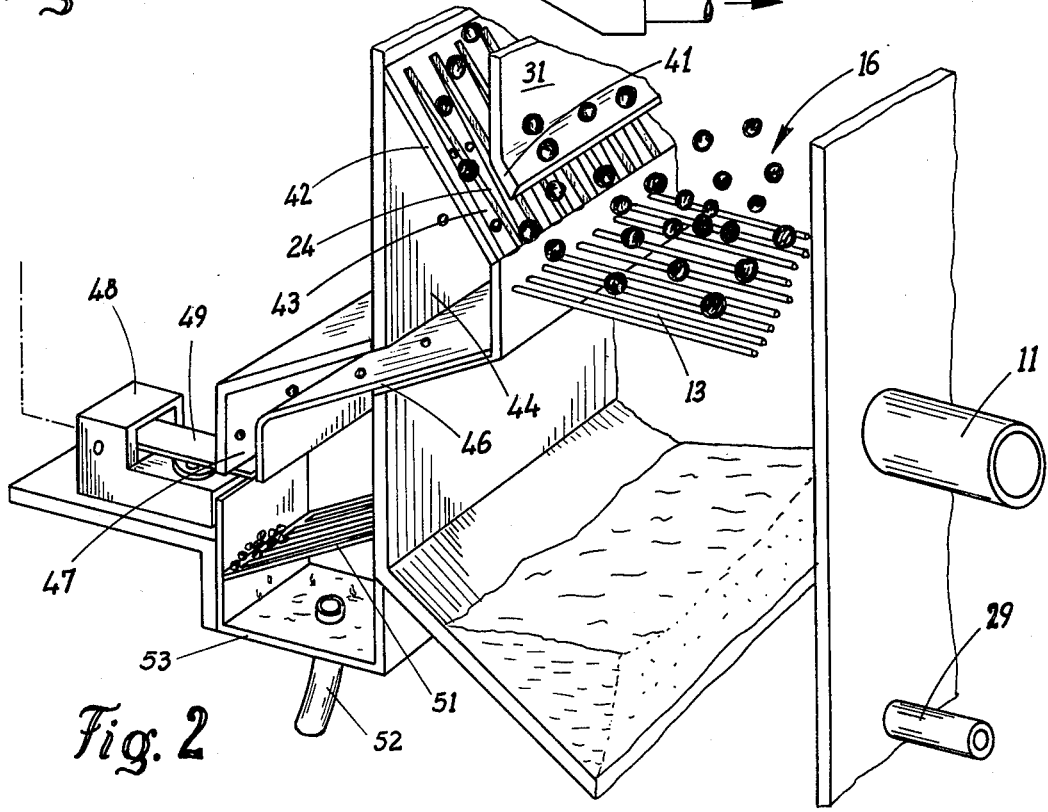

In FIG. 1 there is shown a flow through housing 10 having dirty gas inlet 11 at one end thereof and clean gas outlet 12 at the other. A dirty gas stream enters housing 10 and passes through a first restraining grid 13 extending across one extremity of housing 10. The dirty gas stream then passes into contact zone 16 where it contacts gas contact elements 17, which advantageously are substantially spherical in shape. Substantially spherical elements 17 are coated in a manner described hereinafter with a thin film of scrubbing liquid from either treating fluid inlets 26 or nozzle means 18 or both. Upon contacting substantially spherical elements 17 the dirty gas is cleaned, since the thin film of scrubbing liquid coated thereon either causes particulate matter to adhere thereto, or alternatively, chemically reacts with the impurities in the gas stream. Substantially spherical elements 17 are buoyed upwardly toward a second restraining grid 21 which is positioned angularly to direct their flow out of the gas stream. In many cases, substantially spherical elements 17 are directed out of the gas stream without actually contacting second restraining grid 21. Directing of elements 17 out of the gas stream without contact with grid 21 may be the result of several factors. One factor is the blocking effect of other elements 17 which block the path of a given substantially spherical element 17 and take the place of second restraining grid 21 to effectively direct the substantially spherical element 17 into element treating zone 23. Another factor may be that the gas which is being, or has been, cleaned may tend to flow along the inclined surface of second restraining grid 21 before passing therethrough. There may therefore be a laminar flow of gas which directs substantially spherical elements 17 upwardly along the inclined surface to ultimately be directed into element treating zone 23, without contacting second restraining grid 21. A third factor is the force that the scrubbing fluid emitted from nozzle means 18 exerts upon substantially spherical elements 17. Under certain conditions this force may be sufficient to keep substantially spherical elements 17 from contacting second restraining grid 21. It should be noted in this regard that the velocity and therefore the force of the scrubbing liquid emitted from nozzle means 18 increases as the distance from nozzle means 18 decreases. Therefore, the closer the substantially spherical elements 17 get to nozzle means 18 the more force is exerted downwardly thereupon.

When substantially spherical elements 17 reach the region of contact zone 16 near upper portion 22 of second restraining grid 21 they no longer realize an upward lift from the dirty gas stream since upper portion 22 is gas impervious. The result is that substantially spherical elements 17 fall by gravity into element treating zone 23 which is formed by baffle 31 dividing the portion of housing 10 between first and second restraining grids into a contact zone and the element treating zone. Substantially spherical elements 17 continue to fall downwardly in element treating zone 23, past at least one treating fluid inlet 26, which is preferably emitting a scrubbing liquid, rather than a scrubbing gas, until they reach the lower portion thereof. At the lower terminal end of baffle 31 is a downwardly and inwardly extending portion 41, portion 41 being spaced from and substantially parallel to a sloping surface 42. Sloping surface 42 has disposed therein a plurality of downwardly diverging slots 43, slots 43 being of a selected varying diameter whereby undersized elements pass therethrough and are removed from the scrubbing apparatus. Furthermore, sloping surface 42 merges with restraining grid 13 whereby sloping surface 42 defines the lower extremity of the treating zone 23 and the restraining grid defines the lower extremity of the contact zone 16. The baffle portion 41 and the sloping surface 42 define element exit 24. Disposed directly beneath and spaced from the sloping surface 42 is an element removal trough 44 extending through the wall of the housing 10. Removal trough 44 includes an inclined bottom member 46, the member 46 defining the lower extremity of the removal trough 44, whereby the undersized elements removed from the treating zone 23 are free to flow by gravity out of the scrubbing unit. Disposed directly beneath the discharge outlet 47 is a microswitch 48 with an outwardly extending finger member 49 extending outwardly for actuation by each element discharging from the removal trough 44. Microswitch 48 is in electrical communication with an element feed device to be discussed hereinafter. It is realized that sensing devices other than a microswitch in combination with an outwardly extending finger may also be utilized for sensing the elements removed from the scrubber.

Spaced beneath and in axial alignment with the discharge outlet 47 is an undersized element disposal box 53 adaptable for catching and storing the undersized elements prior to disposition. Disposal box 53 is provided with a porous grid 51 and an opening therein in communication with a slurry drain conduit 52 for draining the slurry from the disposal box 53, the slurry being the drippings from the contact elements which are caught in the box. The grid 51 includes a plurality of openings therein whereby the size of the openings are preselected to allow passage of slurry therethrough while retaining contact elements thereon.

The sloping surface 42 in combination with the removal trough 44 is further provided to prevent the dirty gas stream from overcoming the force exerted by the scrubbing liquid from treating fluid nozzle 26 on substantially spherical elements 17, and forcing them upwardly in element treating zone 23. It thereby prevents a reversal of the circular flow of substantially spherical elements 17 between contact zone 16 and element treating zone 23. The scrubbing liquid from treating fluid inlet 26 cleans the substantially spherical elements 17 leaving them coated with a thin film of the scrubbing liquid, and forcing them again into the dirty gas stream. The scrubbing liquid from scrubbing liquid inlet 26, as well as the scrubbing liquid from nozzle means 18, drains downwardly and is collected in reservoir 28 of housing 10, from which it may be withdrawn through drain 29.

Disposed above the treating zone 23 and in communication therewith is a contact element feed device which includes a hopper 61 for storage of contact elements with a discharge outlet 62 therein and a feed actuating device 63 actuated in response to tripping of microswitch 48. Feed actuating device 63 includes a valve means (not shown) disposed within the hopper discharge outlet 62 whereby a new contact element is added to the scrubbing device each and every time an undersized one is removed.

In the incorporation of the above described addition and removal means of contact elements in a scrubbing apparatus, elements may be added to or removed from the scrubbing apparatus without disturbing the scrubbing operation.

Having described the invention herein what is claimed is:

1. In an improved wet scrubbing apparatus for use in cleaning a gaseous fluid stream which comprises:
   a flow through housing having a dirty gas inlet at one end and a clean gas outlet at the opposite end defining a gas passageway therebetween;
   a first element restraining grid disposed across one extremity of said passageway;
   a second element restraining grid disposed across the other extremity of said passageway, said restraining grids allowing gas to pass therethrough;
   baffle means disposed within said passageway extending from a point adjacent to and spaced from the restraining grid at one extremity of said passageway to a point adjacent to and spaced from the restraining grid at the other extremity of said passageway dividing said passageway between said restraining grids into a contact zone and an element treating zone, said baffle means defining an element entrance and an element exit for said treating zone between said restraining grids, said treating zone including means to introduce scrubbing liquid to said treating zone; and
   a plurality of gas contact elements loosely disposed between said restraining grids, said contact elements being of a density which allows them to be maintained in a buoyant state in said contact zone and directed into said treating zone as a consequence of a gas stream entering said dirty gas inlet and passing through said restraining grids;
   the improvements comprising an element removal means including a sloping surface disposed below said means to introduce said scrubbing liquid, said surface defining the lower extremity of said treating zone, said sloping surface having a diverging downwardly extending slot therein, said sloping surface merging with one of said restraining grids, said restraining grid defining the lower extremity of said contact zone, and a removal trough spaced from and disposed beneath said diverging slot.

2. The apparatus of claim 1 wherein said trough is disposed within said housing and extends substantially the length thereof.

3. The apparatus of claim 1 including an element feed header disposed within said housing and above and in communication with said treating zone.

4. The apparatus of claim 3 wherein said element feed header is in feed flow communication with a feed storage device with a feed actuating device being disposed therebetween, said feed actuating device being actuated in response to an element sensing device disposed in said element removal means, said sensing device being disposed beneath said sloping surface, said sensing device being operated in response to contact elements passing into said element removal means.

5. The apparatus of claim 4 wherein said element sensing device is a microswitch in combination with an outwardly extending finger, said microswitch being actuated in response to preselected movement of said finger.

* * * * *